United States Patent [19]

Reiss

[11] 4,309,018
[45] Jan. 5, 1982

[54] CLAMP-DOWN DEVICE FOR USE IN SECURING A MEMBER IN AN INACCESSIBLE AREA

[75] Inventor: John R. Reiss, North Versailles, Pa.

[73] Assignee: American Standard Inc., Wilmerding, Pa.

[21] Appl. No.: 123,635

[22] Filed: Feb. 22, 1980

[51] Int. Cl.³ .............................................. A47B 97/00
[52] U.S. Cl. .................................. 248/503; 248/505; 248/508
[58] Field of Search ............... 403/388, 393, 384, 406, 403/408, 409; 248/205 R, 503, 505, 507, 508

[56] References Cited

U.S. PATENT DOCUMENTS 3,125,170  3/1964  Rosenvold ..................... 403/388 X
4,012,686  3/1977  Heine ......................... 248/205 R X Primary Examiner—Wayne L. Shedd
Attorney, Agent, or Firm—R. S. Visk

[57] ABSTRACT

A clamp-down device whereby an inaccessible portion, such as the rear end of an equipment rack, for example, may be secured to a base or anchor member from the front end of the rack which is readily accessible. The clamping arrangement includes a clamping bar having a wedge-shaped end which fits into a complementarily wedge-shaped slot in a pin secured to the base and extending through the rear end of the equipment rack. A jack-screw is operatively connected between the equipment rack and the clamping bar adjacent the front or accessible end of the rack, so that by turning the jack-screw, the wedge-shaped end of the clamping bar is forced tightly into the wedge-shaped slot in the pin to thereby draw the rear portion of the rack tightly against the base.

7 Claims, 4 Drawing Figures

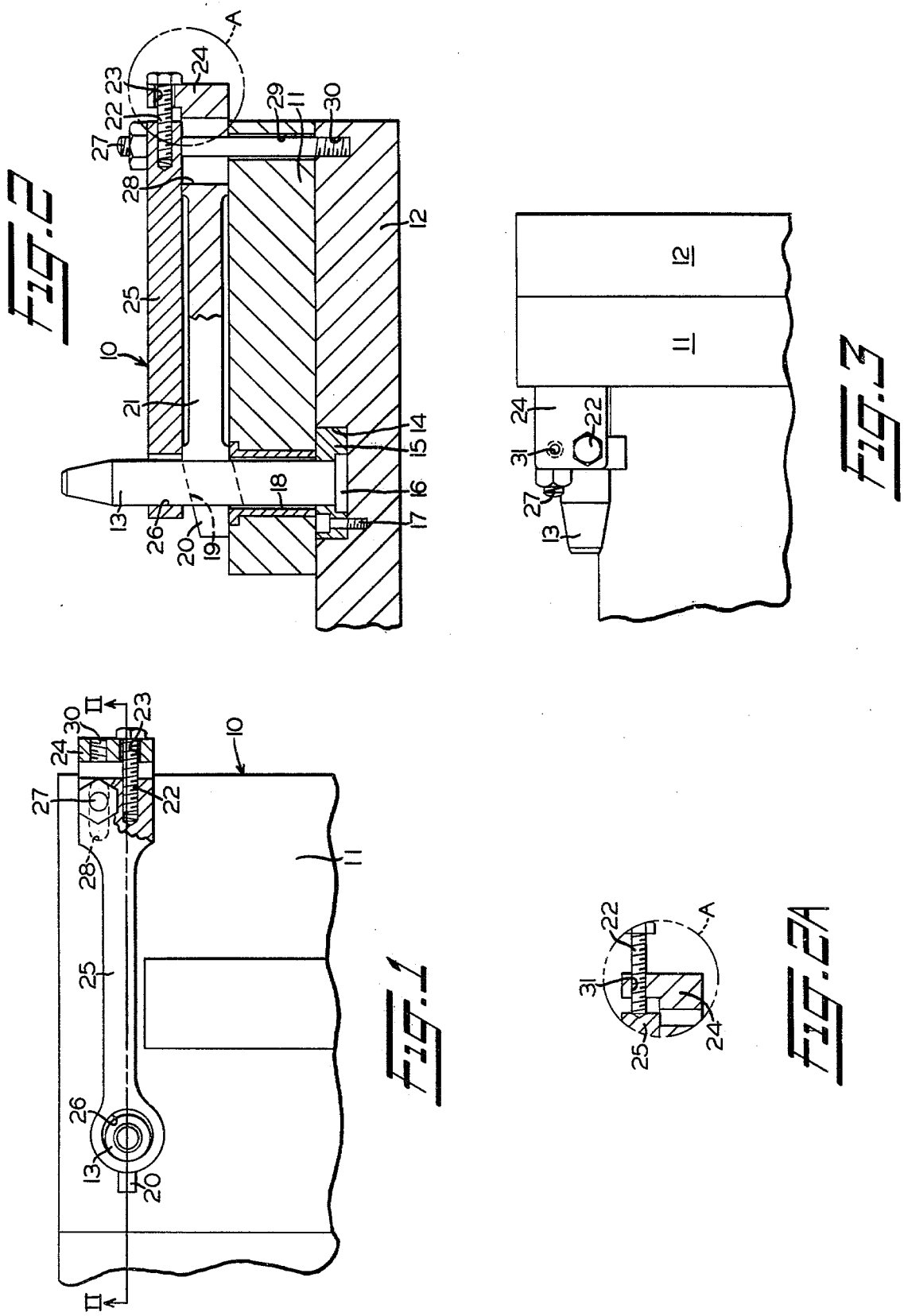

CLAMP-DOWN DEVICE FOR USE IN SECURING A MEMBER IN AN INACCESSIBLE AREA

BACKGROUND OF THE INVENTION

In certain situations, it is impractical or impossible to use conventional means, such as bolting, for example, for securing one member to another, especially if some portion of the one member is inaccessible. For example, locomotive equipment racks may be mounted in a vertical position in certain locomotives and bolted along the front edge to a pipe bracket or manifold that is in turn secured to the locomotive floor. While it is desirable to also secure the equipment rack along its rear edge, space limitations make the rear edge inaccessible in so far as conventional securing means are concerned.

SUMMARY OF THE INVENTION

The object of the present invention, therefore, is to provide a novel clamping device for securing a member in an area that is otherwise inaccessible by conventional means.

Briefly, the invention comprises a clamping device having a locking pin secured perpendicularly to and in an inaccessible end of a fixed member to which a removable member is to be secured. The locking pin is provided with a slot having an angle of inclination conforming to a wedge-shaped end of a clamping bar which is inserted in said slot. The other end of the clamping bar is provided with a jack-screw interconnecting the clamping bar to a fixed support member whereby the clamping bar may be moved axially relative to the locking pin so that the wedge-shaped end is forced securely into the slot and thereby tightly secures the removable member to the fixed member. A clamping device is installed at each location where a bolt would normally be provided if possible. The jack-screw may also be moved from one position to another and, therefore, may be used for retracting the clamping bar out of the locking pin slot.

BRIEF DESCRIPTION OF THE DRAWING

FIG. 1 is a plan view, primarily in outline, of a clamp-down device embodying the invention;

FIG. 2 is a side elevational view, in section, taken along line II—II of FIG. 1 looking in the direction of the arrows;

FIG. 2A is a fragmentary view, in section, of the area indicated A in FIG. 2; and FIG. 3 is an end view, in outline, of the device looking toward the right side of FIG. 1.

DESCRIPTION AND OPERATION

As best seen in FIG. 2 of the drawing, a clamp-down device 10 embodying the invention may be employed, for example, for securing the inaccessible rear portion of the apparatus, such as an equipment mounting rack 11, to a pipe manifold or base member 12 secured to the locomotive floor.

Clamping device 10 comprises an anchor pin 13 secured vertically in a recess 14 in pipe manifold 12 at each location where a conventional securing bolt would normally be employed, only one of such locations being shown. A retaining collar 15, provided with a shoulder that fits over a head 16 of the anchor pin 13, is bolted down by a plurality of cap screws 17 for securing said anchor pin prior to securement of equipment rack mounting base 11.

Mounting base 11 is provided with correspondingly disposed bushed holes 18 which slide over the projecting anchor pins 13 when the mounting base is set in place on pipe manifold 12. A tapered slot 19 is formed transversely in anchor pin 13 with an angle of inclination corresponding to a wedge-shaped end 20 of a clamping bar 21. Clamping bar 21 rests on the top surface of mounting base 11 and is inserted from the front (right side as viewed in FIG. 2) rearwardly (left side as viewed in FIG. 2) to a locking position with wedge end 20 wedged in slot 19 of pin 13.

A jack-screw 22 passes through a bore 23 provided in a front flange 24 of clamping bar 21 for threaded engagement with the front end of a support member 25 (see area A, FIG. 1), which is also provided with a correspondingly disposed opening 26 for receiving pin 13. As jack-screw 22 is tightened, the wedging action of wedge end 20 of clamping bar 21 with slot 19 of pin 13 forces said clamping bar, at the pin end, downwardly and tightly against the rear end of base 11 for holding it tightly against pipe manifold 12. During such wedging action, support member 25 prevents anchoring pin 13 from being bent out of its vertical disposition, because the resultant forces are resolved in a downward deflection of the clamping bar 21. A mounting bolt 27 passes through a coaxially elongated slot 28 in the front end of clamping bar 21, through a bore 29 in mounting base 11, and screws into a threaded hole 30 in pipe manifold 12 for securing the front end of said mounting base.

As shown in FIG. 2A, clamping bar 21 may be withdrawn by removing jack-screw 22 from threaded engagement with support member 25 and screw threading it into an adjacent screw threaded opening 31 and into abutting engagement with the end face of support member 24. See FIG. 2A. Thus, as screw 21 is screwed against support member 24, wedge end 20 of clamping bar 21 is withdrawn from slot 19 of pin 13, so that the support member 25 and the clamping bar 21 may then be removed after removal of the nut from bolt 27.

Having now described the invention, what I claim as new and desire to secure by Letters Patent, is:

1. A clamp-down device for removably securing an equipment member to a fixed base member having an accessible end and an inaccessible opposite end inaccessible to use of conventional securing means, said clamp-down device comprising:
   (a) an anchor pin secured in said base member adjacent the inaccessible end,
   (b) said equipment member having a hole formed therein at one end for receiving said anchor pin,
   (c) said anchor pin having a slot extending transversely therethrough;
   (d) a clamping bar insertable in the clamp-down device from said accessible end toward said anchor pin, to a locking position in which a wedge-shaped end on the clamping bar is wedged in said transverse slot of said anchor pin; and
   (e) means for exerting a force on said clamping bar for effecting wedging action of said wedge-shaped end in said slot for securing said equipment member to said base member.

2. A clamp-down device, as set forth in claim 1, wherein one side of said slot in said anchor pin is formed with an angle of inclination complementing a correspondingly disposed angled side formed in said wedge-shaped end of the anchor pin.

3. A clamp-down device, as set forth in claim 1, wherein the last mentioned means comprises:
  (a) a support member having a bore at one end for encircling said anchor pin, said support member resting on said clamping bar and extending from the anchor pin to said accessible end; and
  (d) a jack-screw extending through a bore formed in a flange portion of the clamping bar and screwing into an aligned threaded hole formed in the adjacent end of said support member,
  (c) said jack-screw being effective, when screwed into said threaded hole, for exerting said force on said clamping bar to force the wedge-shaped end into said slot of the anchor pin.

4. A clamp-down device, as set forth in claim 3, wherein:
  (a) said anchor pin is disposed in a vertical position relative to the base member,
  (b) said equipment member occupying a resting, horizontal position on the base member,
  (c) said clamping bar and said support member being disposed in horizontal positions relative to, and resting one on the other on the equipment member.

5. A clamp-down device, as set forth in claim 3, further characterized by a bolt passing vertically through one end of said support member adjacent the accessible end of the equipment member, through an opening formed in the corresponding end of said clamping bar, through an aligned bore in the equipment member, and screwed into a threaded hole in the mounting base for securing the equipment member, the clamping bar, and the support member in assembled relation.

6. A clamp-down device, as set forth in claim 3, further characterized by retracting means for retracting said clamping bar from said slot in the anchor pin.

7. A clamp-down device, as set forth in claim 6, wherein said retracting means comprises a screw threaded hole formed in said flange portion of said clamping bar parallel to said bore formed therein, and said jack-screw, when screwed into the last said screw threaded hole into abutting contact with an end face of the support member, being effective for exerting a retracting force of the clamping bar.

* * * * *